(12) United States Patent
Wong

(10) Patent No.: US 9,766,881 B2
(45) Date of Patent: Sep. 19, 2017

(54) SOCIAL PROJECT MANAGEMENT SYSTEM AND MARKETPLACE

(71) Applicant: salesforce.com, inc., San Francisco, CA (US)

(72) Inventor: Belinda Wong, San Bruno, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/917,289

(22) Filed: Jun. 13, 2013

(65) Prior Publication Data

US 2014/0007038 A1 Jan. 2, 2014

Related U.S. Application Data

(60) Provisional application No. 61/667,323, filed on Jul. 2, 2012.

(51) Int. Cl.
*G06F 9/44* (2006.01)
*G06Q 10/06* (2012.01)

(52) U.S. Cl.
CPC .............. *G06F 8/70* (2013.01); *G06Q 10/06* (2013.01)

(58) Field of Classification Search
CPC ........................................ G06F 9/44
USPC ........................................ 717/101
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,907,490 A * | 5/1999 | Oliver ............................ 700/90 |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |

(Continued)

*Primary Examiner* — Jae Jeon

(74) *Attorney, Agent, or Firm* — Lorenz & Kopf, LLP

(57) ABSTRACT

In one embodiment, a computer-implemented method executable by a multi-tenant server system to manage a project is provided. The method includes receiving user input data indicating project data that includes at least one of project information, task information, and details information associated with the project; associating tenant-specific metadata with the project data; and storing the project data and the associated tenant-specific metadata in a project data datastore.

8 Claims, 5 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,938,007 B1 * | 8/2005 | Iulianello ............... G06Q 10/06 705/34 |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 7,801,914 B2 * | 9/2010 | Greene ............ G06F 17/30967 707/779 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0065798 A1 * | 5/2002 | Bostleman et al. ............... 707/1 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0123733 A1 * | 7/2003 | Keskar et al. ................. 382/187 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0204971 A1 * | 10/2004 | Graham et al. .................. 705/7 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0041447 A1 * | 2/2006 | Vucina et al. .................. 705/1 |
| 2007/0233545 A1 * | 10/2007 | Cala ..................... G06Q 10/06 705/7.15 |
| 2008/0140654 A1 * | 6/2008 | Daley ................... G06Q 10/06 |
| 2008/0301698 A1 * | 12/2008 | Badaloo ................ G06Q 10/06 718/107 |
| 2009/0035733 A1 * | 2/2009 | Meitar et al. ................. 434/118 |
| 2009/0043622 A1 * | 2/2009 | Finlayson et al. ................ 705/7 |
| 2011/0238760 A1 * | 9/2011 | Kuruganti ......... G06F 17/30306 709/206 |
| 2012/0036132 A1 * | 2/2012 | Doyle ............... G06F 17/30038 707/738 |
| 2012/0215578 A1 * | 8/2012 | Swierz, III ........... G06Q 50/205 705/7.14 |
| 2012/0258777 A1 * | 10/2012 | Huang ................. H04W 4/003 455/557 |
| 2013/0166591 A1 * | 6/2013 | Nandyal ........... G06F 17/30277 707/769 |
| 2014/0032256 A1 * | 1/2014 | Hess et al. ................... 705/7.24 |

* cited by examiner

SOCIAL PROJECT MANAGEMENT SYSTEM AND MARKETPLACE

CROSS-REFERENCE TO RELATED APPLICATION

This application claims the benefit of U.S. provisional patent application Ser. No. 61/667,323, filed Jul. 2, 2012, which is hereby incorporated by reference in its entirety.

TECHNICAL FIELD

Embodiments of the subject matter described herein relate generally to methods and systems for managing projects. More particularly, embodiments of the subject matter relate to methods and systems for managing projects in a multi-tenant environment.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, access can be granted or denied to specific sets of data for any user within the multi-tenant platform, thereby improving collaboration and integration between applications and the data managed by the various applications.

Accordingly, it is desirable to provide methods and systems for managing a project in a multi-tenant environment. In addition, it is desirable to provide methods and systems for making projects available for use in a marketplace of a multi-tenant environment. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
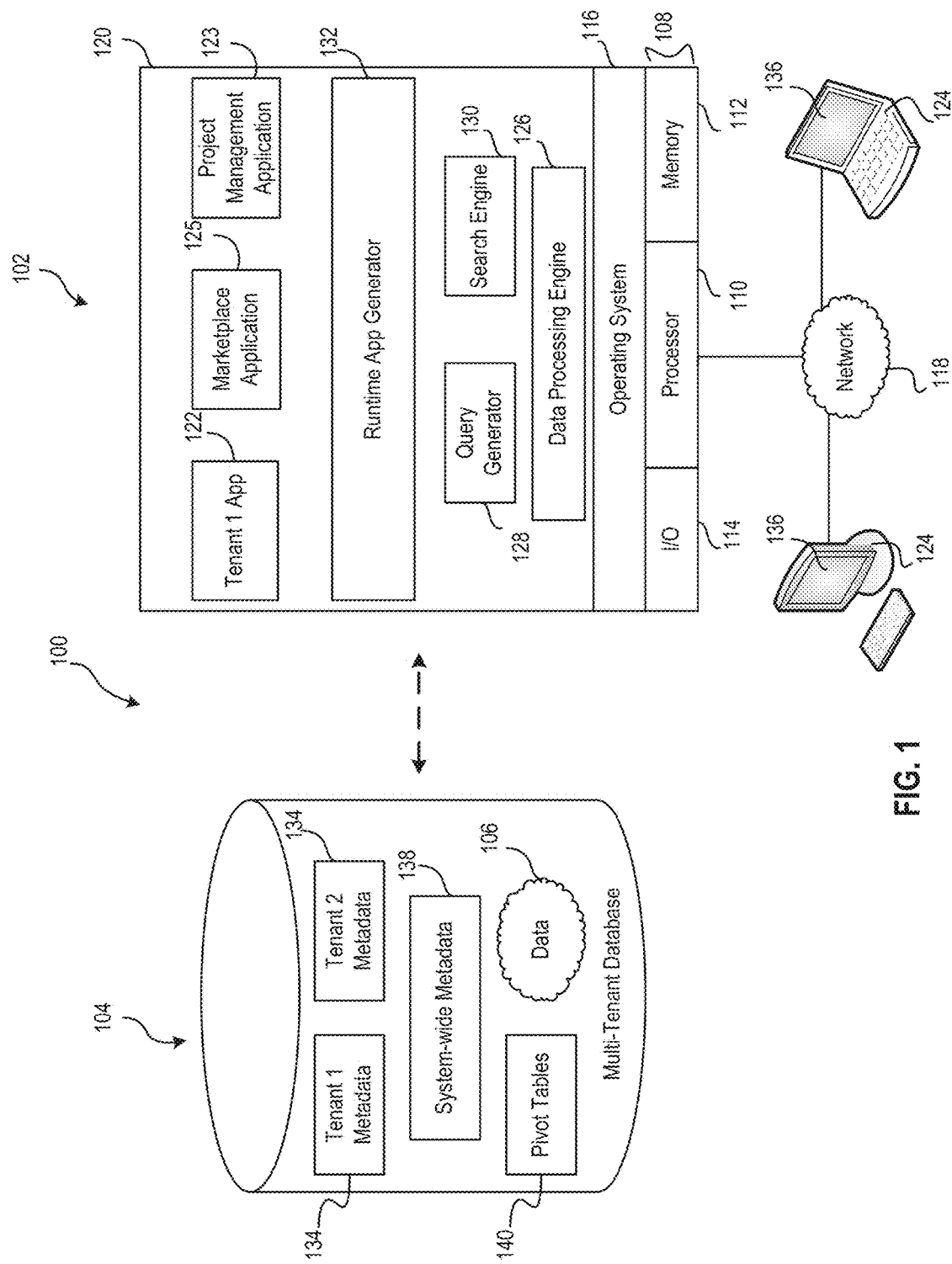
FIG. 1 is a block diagram of an exemplary multi-tenant data processing system having a project management system in accordance with various embodiments.

The following detailed description is merely exemplary in nature and is not intended to limit the disclosure the application and uses of the disclosure. Furthermore, there is no intention to be bound by any expressed or implied theory presented in the preceding technical field, background, brief summary or the following detailed description. It should be understood that throughout the drawings, corresponding reference numerals indicate like or corresponding parts and features.

The exemplary embodiments presented here relate to a project management system and related techniques, methodologies, procedures, and technology for managing projects in a multi-tenant environment. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another.

In accordance with exemplary embodiments described below, a computer based system is provided, such as a multi-tenant system, that provides a project management service to a plurality of different tenants, a plurality of different end users, and/or a plurality of different tenant applications. The project management service may be provided by a project management system. The project management system detects and applies appropriate rules to ensure proper data visibility when creating and managing a project. The project management system further identifies templates and makes them available for use in a multi-tenant marketplace in a manner that ensures proper data visibility.

Turning now to FIG. 1, an exemplary multi-tenant system 100 is shown to include a server 102 that is associated with a multi-tenant database 104. In accordance with various non-limiting examples, the system 100 may be implemented in the form of a multi-tenant customer relationship management system that can support any number of authenticated users of multiple tenants. A "tenant" or an "organization" generally refers to a group of users that shares access to common data 106 within the database 104. Tenants may represent customers, customer departments, business or legal organizations, and/or any other entities that maintain data for particular sets of users within the system 100. Although multiple tenants may share access to the server 102 and the database 104, the particular data and services provided from the server 102 to each tenant can be securely isolated from those provided to other tenants. The multi-tenant architecture therefore allows different sets of users to share functionality while managing the sharing of any or none of the data 106.

With initial reference to the server 102, the server 102, as shown, generally includes any sort of conventional processing hardware 108, such as a processor 110, memory 112, input/output features 114 and the like, that are managed and accessed by a suitable operating system 116. The processor 110 may be implemented using one or more of microprocessors, microcontrollers, processing cores and/or other computing resources spread across any number of distributed or integrated systems, including any number of "cloud-based" or other virtual systems. The memory 112 represents any non-transitory short or long term storage capable of storing programming instructions for execution on the processor 110, including any sort of random access memory (RAM), read only memory (ROM), flash memory, magnetic or optical mass storage, and/or the like. The input/output features 114 represent conventional interfaces to networks (e.g., to a network 118, or any other local area, wide area or other network), mass storage, display devices, data entry devices and/or the like. As can be appreciated, the server 102 may be implemented using a cluster of actual and/or virtual servers operating in conjunction with each other, typically in association with conventional network communications, cluster management, load balancing and other features as appropriate The server 102 typically includes or cooperates with some type of computer-readable media, where a tangible computer-readable medium has computer-executable instructions stored thereon. The computer-executable instructions, when read and executed by the server 102, cause the server 102 to perform certain tasks, operations, functions, and processes described in more detail herein. In this regard, the memory 112 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The server 102, as shown, further includes an application platform 120 that may be any sort of software application or other data processing engine that generates virtual applications 122 that provide data and/or services to user devices 124. The virtual applications 122 are typically generated at run-time in response to queries received from the user devices 124. The user devices 124 are typically operated by various tenants that subscribe to the system 100. As will be discussed in more detail below, the virtual applications 122 include, but are not limited to, a project management application 123, and a marketplace application 125.

For the illustrated embodiment, the application platform 120 includes a bulk data processing engine 126, a query generator 128, a search engine 130 that provides text indexing and other search functionality, and a runtime application generator 132. Each of these features may be implemented as a separate process or other module, and many equivalent embodiments could include different and/or additional features, components or other modules as desired.

The data processing engine 126 performs bulk processing operations on the data 106 such as uploads or downloads, updates, online transaction processing, and/or the like that are requested by the query generator 128, the search engine 130, the virtual applications 122, etc. In various embodiments, less urgent bulk processing of the data 106 can be scheduled to occur as processing resources become available, thereby giving priority to more urgent data processing by the query generator 128, the search engine 130, the virtual applications 122, etc.

The runtime application generator 132 dynamically builds and executes the virtual applications 122 in response to specific requests received from the user devices 124. The virtual applications 122 created by or for the tenants are typically constructed in accordance with the tenant-specific metadata 134, which describes particular tables, reports, interfaces and/or other features of the particular application. In various embodiments, each virtual application 122 generates dynamic web content that can be served to a browser or other client program 136 associated with its user device 124, as appropriate. As used herein, such web content represents one type of resource, data, or information that may be protected or secured using various user authentication procedures.

The runtime application generator 132 and/or the virtual applications 122 (including the project management application 123 and the marketplace application 125) interact with the query generator 128 to efficiently obtain multi-tenant data 106 from the database 104 as needed. In various embodiments, the query generator 128 considers the identity of the user requesting a particular function, and then builds and suggests queries to the user. The query generator 128 maintains security of the common database 104 by ensuring that queries are consistent with access privileges granted to a user that initiated the request. The query generator 128 suggests alternate queries based on the initial request while maintaining the security of the common database 104.

With reference now to the database 104, the database 104 is any sort of repository or other data storage system capable of storing and managing the data 106 associated with any number of tenants. The database 104 may be implemented using any type of conventional database server hardware. In various embodiments, the database 104 shares processing hardware 108 with the server 102. In other embodiments, the database 104 is implemented using separate physical and/or virtual database server hardware that communicates with the server 102 to perform the various functions described herein.

The data 106 may be organized and formatted in any manner to support the application platform 120. In various embodiments, the data 106 is suitably organized into a relatively small number of large data tables to maintain a semi-amorphous "heap"-type format. The data 106 can then be organized as needed for a particular virtual application 122. In various embodiments, conventional data relationships are established using any number of pivot tables 140 that establish indexing, uniqueness, relationships between entities, and/or other aspects of conventional database organization as desired.

Further data manipulation and report formatting is generally performed at run-time using a variety of metadata constructs. The system-wide metadata 138, for example, can be used to describe any number of forms, reports, workflows, user access privileges, business logic and other constructs that are common to multiple tenants. Tenant-specific formatting, functions and other constructs may be maintained as tenant-specific metadata 134 for each tenant, as desired. Rather than forcing the data 106 into an inflexible global structure that is common to all tenants and applications, the database 106 is organized to be relatively amorphous, with the pivot tables 140 and the metadata 134 providing additional structure on an as-needed basis. To that end, the application platform 120 suitably uses the pivot tables 140 and/or the metadata 134 to generate "virtual" components of the virtual applications 122 to logically obtain, process, and present the relatively amorphous data 106 from the database 104.

In operation, the data and services provided by the server 102 can be retrieved using any sort of personal computer, mobile telephone, portable device, tablet computer, or other network-enabled user device 124 that communicates via the network 118. Typically, the user operates a conventional browser or other client program 124 to contact the server 102 via the network 118 using, for example, the hypertext transport protocol (HTTP) or the like. The user typically authenticates his or her identity to the server 102 to obtain a session identifier ("SessionID") that identifies the user in subsequent communications with the server 102. When the identified user requests access to a virtual application 122, the runtime application generator 132 suitably creates the application at run time based upon the metadata 134, as appropriate. The query generator 128 suitably obtains the requested data 106 from the database 104 as needed to populate the tables, reports or other features of the particular virtual application 122. As noted above, the virtual application 122 may contain Java, ActiveX, or other content that can be presented using conventional client software running on the user device 124; other embodiments may simply provide dynamic web or other content that can be presented and viewed by the user, as desired.

Upon selection by a user, the project management application 123 allows one or more users to create and manage a project. For example, the project management application 123 includes one or more interfaces that are accessed by a user and that allow a user to define tasks of a project. The tasks can be defined by details pertaining to dates (e.g., planned and actual dates), durations (e.g., planned and actual durations), and relationships between other tasks. The project management application 123 manages the tasks and the details as data 106 stored in the database 104 based on the tenant specific metadata 134. In this way, the accessibility of the data 106 associated with the project, tasks, and details can be controlled.

Upon creation of a project, the project management application 123 monitors the tasks and/or task relationships to determine tasks of the project that are necessary to complete the project (referred to as critical tasks) and to determine a path of completing the critical tasks (referred to as a critical path). The project management application 123 generates templates for future use based on the identified critical tasks and critical paths. In various embodiments, the project management application 123 generates the templates by anonomizing tenant specific details associated with the critical tasks and tagging the critical tasks such that they may be reused.

The marketplace application 125, when selected by a user, allows users of the system to access the templates. For example, the marketplace application 125 includes one or more interfaces that are accessed by a user and that allow a user to search and select templates generated by the project management application 123. Once selected, the marketplace application 125 allows the user to use the template in the project management application 123 to create a new tenant-specific project or task.

Figure 2:
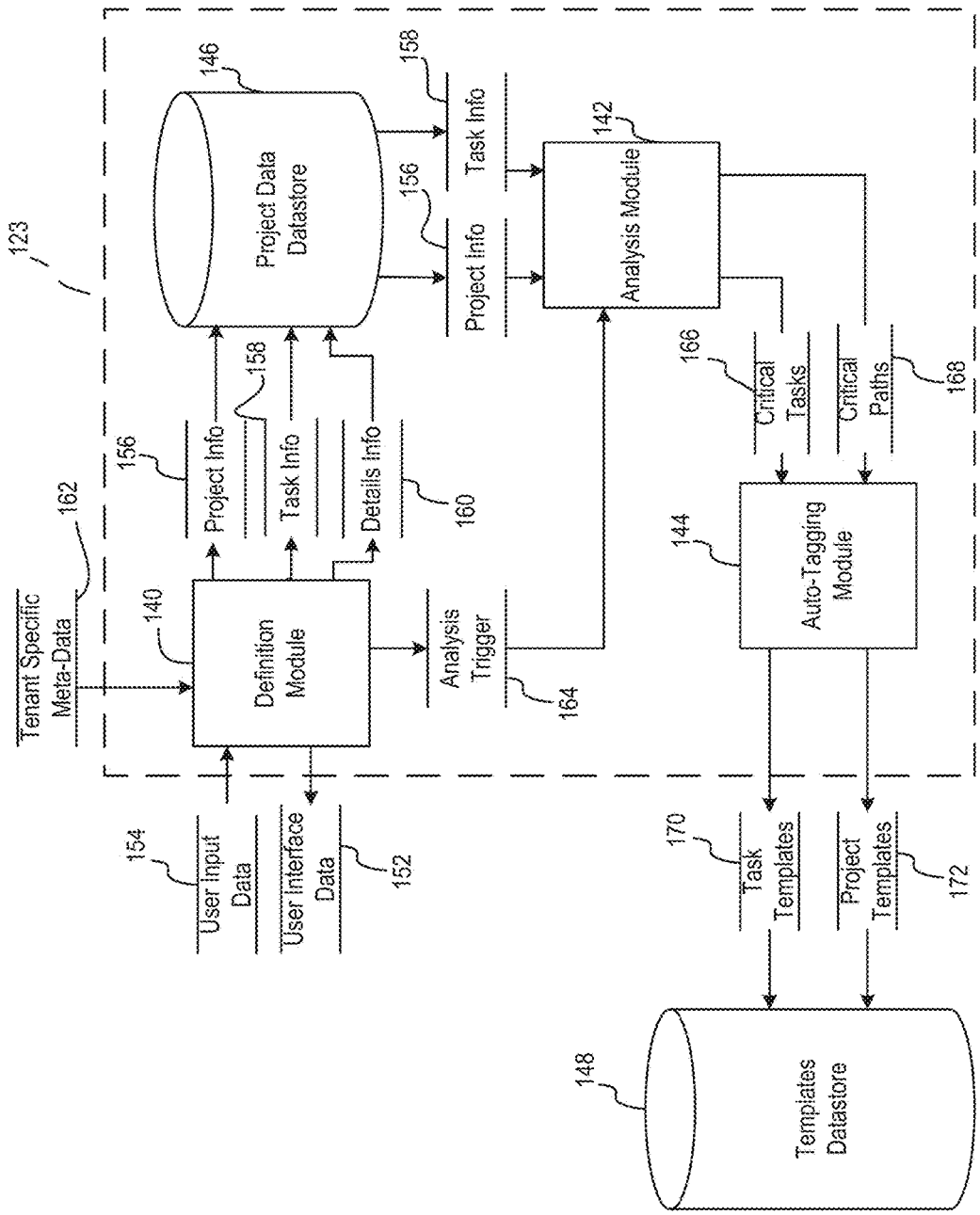
FIGS. 2-3 are dataflow diagrams illustrating a project management system in accordance with various embodiments.
Figure 3:
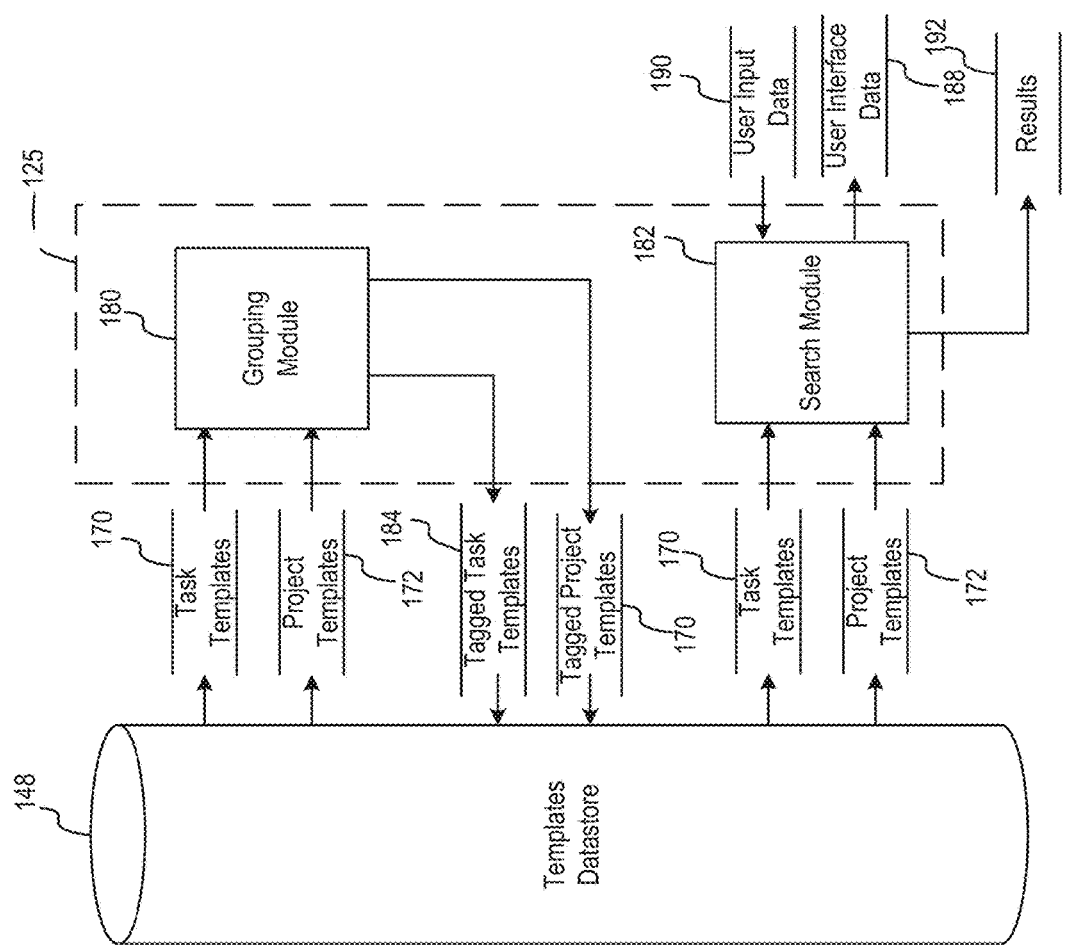

Turning now to FIGS. 2 and 3, block diagrams illustrate an exemplary project management application 123 (FIG. 2) and an exemplary marketplace application 125 (FIG. 3) suitable for use in a computer-implemented server system such as the system 100 shown in FIG. 1. With initial reference to FIG. 2, the generalized exemplary embodiment of the project management application 123 includes, but is not limited to a definition module 140, an analysis module 142, an auto-tagging module 144, and a project data datastore 146. As can be appreciated, the order in which the modules perform their functions varies in accordance with various embodiments.

The project management application 123 interfaces with a templates datastore 148. The templates datastore 148 may be implemented as part of the project management application 123 or, alternatively, as a separate datastore (as shown). As can be appreciated, the project data datastore 146 and the templates datastore 148 can be any data storage device or a combination of storage devices that may temporarily or permanently store data used by the project management application 123 and may be implemented on the server 102, on the database 104, and/or partly on the server 102 and partly on the database 104.

The definition module 140 generates user interface data 152 that is used to display one or more project management user interfaces of the project management application 123. For example, each of the project management user interfaces can include one or more text entry items, drop-down menus, selection items, and/or graphics related to defining or managing a project, a task, and/or details of the task.

The definition module 140 receives as input user input data 154 that is generated based on a user's interaction with the project management user interface(s). The user input data 154 can include information about a project, a task, and/or details of a task. The definition module 140 evaluates the user input data 154 and associates project information 156, task information 158, and/or details information 160 of the user input data 154 with tenant-specific metadata 162. The definition module 140 stores the information 156-160 including the associated tenant-specific metadata 162 in the project data datastore 146.

In various embodiments, the definition module 140 further sets an analysis trigger 164. The analysis trigger 164 is set to indicate a project or tasks in which to perform further analysis. The analysis trigger 164 may be set based on predetermined events (e.g., when a particular project or task is complete) or based on input from the user indicating to perform the analysis.

The analysis module 142 receives as input the analysis trigger 164. When the analysis trigger 164 indicates to perform an analysis of a project or one or more tasks, the analysis module 142 retrieves the project information 156 and/or the task information 158 associated with the indicated project or tasks from the project data datastore 146. The analysis module 142 performs a critical path analysis on the project information 156 and/or the task information 158. For example, the analysis module 142 identifies critical tasks 166 of the project based on connecting the activities in a project into a network plan and allowing users to identify activity durations and different relationships between the activities, such as finish-to-start, start-to-finish, or finish-to-finish dependencies. The task analysis module then evaluates the relationships between the critical tasks 166 of the project to identify one or more critical paths 168.

For example, the analysis is described in the context of a simplified water re-piping project. The simplified water re-piping project may be defined by a user to have four major activities 1) procure pipe, 2) deactivate water line, 3) remove pipe, and 4) install new pipe. The following Table 1 summarizes the duration and relationships that may have been provided between the four activities:

TABLE 1

| Activity | Duration | Dependency |
|---|---|---|
| 1) Procure pipe | 5 days | None |
| 2) Deactivate water line | 1 day | None |

TABLE 1-continued

| Activity | Duration | Dependency |
| --- | --- | --- |
| 3) Remove pipe | 1 day | Can't start until 2) Deactivate water line is finished. |
| 4) Install new pipe | 2 days | Can't start until Both 3) Remove pipe and 1) Procure pipe are finished. |

Each of the four major activities can be identified as critical tasks. Based on the duration (i.e., longest durations) and relationships (i.e., one depends on another) of the activities, the critical path of the project can be identified as 1) procure pipe and 4) install new pipe. A secondary critical path may be identified as 2) remove pipe and 4) install new pipe.

The auto-tagging module 144 receives as input the critical tasks 166 and/or the critical path(s) 168 that were identified by the analysis module 142. The auto-tagging module 144 evaluates the critical tasks 166 and critical paths 168 and removes any tenant-specific data and/or data. The auto-tagging module 144 then tags the critical tasks 166 and/or the critical paths 168 based on a categorization scheme. The categorization scheme leverages inputs from the task descriptions, key words, and crowd-sourced data to group similar tasks together for the purpose of averaging durations and comparing dependency relationships. For example, provided the water re-piping project example, projects with "pipe" in the task descriptions can be evaluated for similarity, then tasks inside the projects can be evaluated for grouping. The tagged tasks and/or paths are then stored as task templates 170 and/or project templates 172 respectively in the templates datastore 148. Once published into the templates datastore 148, users can add tags and key words.

With reference now to FIG. 3, the marketplace application 125 is illustrated in accordance with various embodiments. This generalized exemplary embodiment of the marketplace application 125 includes, but is not limited to, a grouping module 180, and a search module 182. As can be appreciated, the order in which the modules perform their functions varies in accordance with various embodiments. As shown, the marketplace application 125 interfaces with the templates datastore 148 to provide one or more templates to requesting users.

The grouping module 180 evaluates the task templates 170 and/or the project templates 172 stored in the templates datastore 148 and groups one or more of the templates. For example, templates 170, 172 associated with a similar category or having similar tasks or details may be grouped. In various embodiments, a single template may be associated with one or more groups. The grouping module 180 tags the templates with metadata to indicate their association with the one or more group. If multiple similar templates are associated with a particular group, at least one of the similar templates may further be tagged to indicate that the template is a standard type template (e.g., that the template is an industry standard as defined by users of the multi-tenant system). In various embodiments, the evaluation and grouping can be performed periodically and/or at scheduled events (e.g., upon a search request, upon receipt of a new template, etc.). The tagged task templates 184 and the tagged project templates 186 are then stored in the templates datastore 148.

The search module 182 generates user interface data 188 that is used to display one or more search user interfaces of the marketplace application 125. For example, each of the search user interfaces can include one or more text entry items, drop-down menus, selection items, and/or graphics related to searching and producing templates from the templates datastore 148.

The search module 182 receives as input user input data 190 that is generated based on a user's interaction with the user interface(s). The user input data 190 can include search criteria such as, but not limited to, a particular category or a term associated with a particular category. Based on the user input data 190, the search module 182 searches the meta-data associated with the tasks or projects of the templates datastore 148. If a single task or project or group of tasks or projects match the search criteria, results 192 including the matched task templates 170 and/or project templates 172 are provided to the user (e.g., via the user interface data 188). If a standard template has been identified for the search criteria, the results 192 include the standard template and an indication that the template is standard. In various embodiments, the results 192 are provided to the user such that they may be used in the development of a new task or project in the project management application 123.

Figure 4:
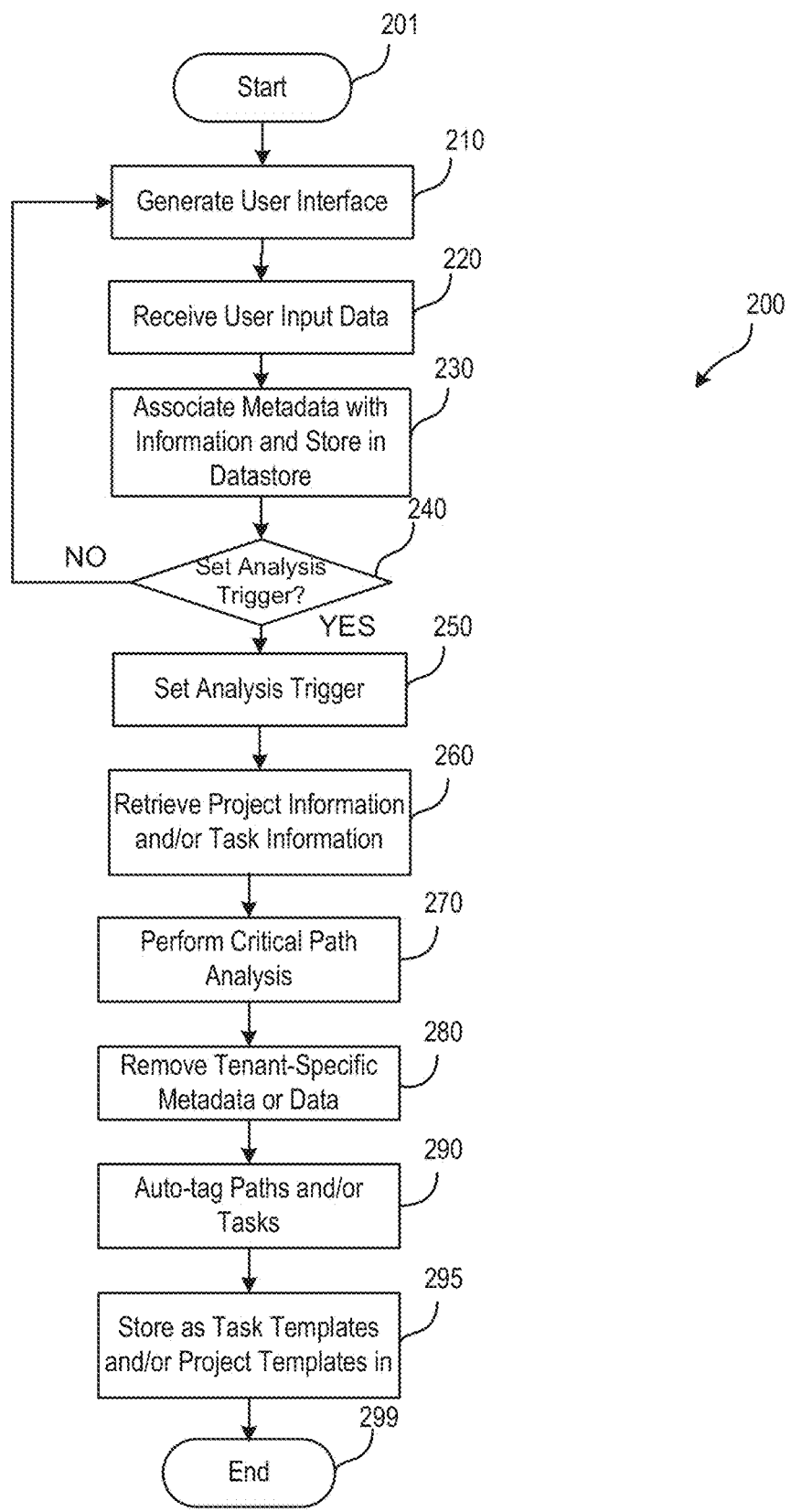
FIGS. 4-5 are flowcharts illustrating project management methods in accordance with various embodiments.
Figure 5:
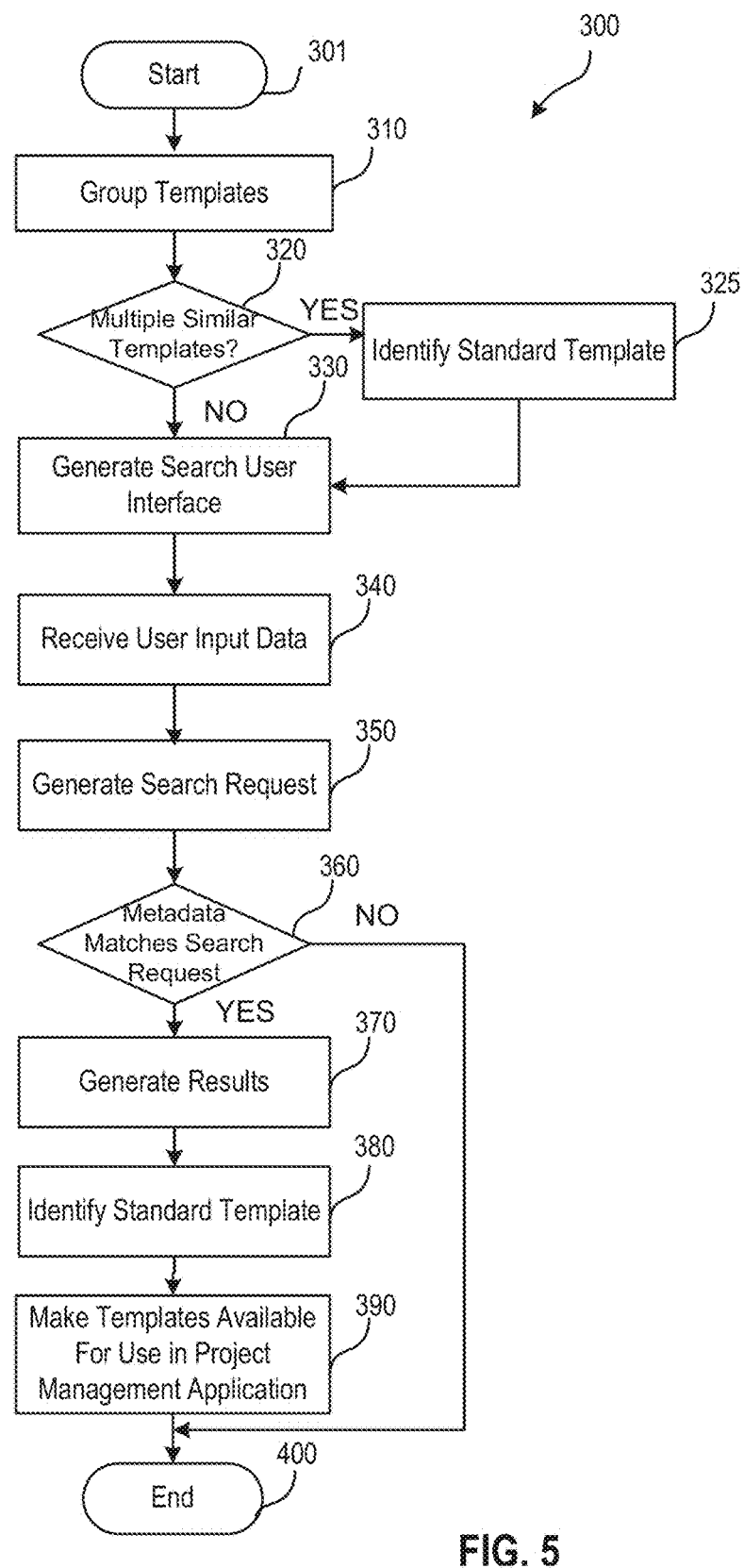

Turning now to FIGS. 4-5, flowcharts illustrate exemplary methods 200-300 related to the managing of a project in a multi-tenant environment. The various tasks performed in connection with the methods 200-300 may be performed by software, hardware, firmware, or any combination thereof. In other words, the methods 200-300 may represent a computer-implemented method to establish and manage tasks and/or projects in a multi-tenant environment. In particular, the methods 200-300 are executable by a suitably configured server system or a functional module of a server system, such as the system described above. For illustrative purposes, the following description of the methods 200-300 may refer to elements mentioned above in connection with FIGS. 1-3. In practice, portions of the methods 200-300 may be performed by different elements of the described system. As can be appreciated, the methods 200-300 may include any number of additional or alternative steps, the steps shown in FIG. 4-5 need not be performed in the illustrated order, and the methods 200-300 may be incorporated into a more comprehensive procedure or process having additional functionality not described in detail herein. Moreover, one or more of the steps shown in FIGS. 4-5 could be omitted from embodiments of the methods 200-300 as long as the intended overall functionality remains intact.

The methods 200-300 assumes that the server 102 has already been provided with the modules and functionality described above.

With reference to FIG. 4, a method 200 of managing a project is shown. In one example, the method 200 may begin at 201. The project management user interface(s) is generated based on the user interface data 152 at 210. User interactions with the project management user interface(s) are received as user input data 154 at 220. The user input data 154 is evaluated, associated with tenant specific metadata 162, and stored in the project data datastore 146 as a project, a task, and/or details of a task at 230. The user input data 154 is further evaluated to determine whether to set the analysis trigger. If the user input data 154 does not indicate a particular condition in which to trigger an analysis (e.g., non-complete task or project) at 240, the method continues with generating the project management user interface based on the user interface data 152 at 210.

If, however, the user input data 154 indicates a particular condition in which to trigger an analysis (e.g., a completion of one or more tasks or a project) at 240, the analysis trigger 164 is set to indicate to perform an analysis on the task or project at 250. The information 156, 158 associated with the task or project is retrieved from the project data datastore 146 at 260. The critical path analysis is performed on the information 156, 158 at 270 to identify critical tasks 166 and/or critical paths 168. Any tenant-specific metadata or data associated with the critical tasks 166 and/or critical paths 168 is removed at 280. The cleaned tasks or paths are auto-tagged at 290 and stored as templates 170, 172 in the templates datastore 148 at 295. Thereafter, the method may end at 299.

With reference to FIG. 5, a method 300 of managing a marketplace of project templates is shown. In one example, the method 300 may begin at 301. Templates 170, 172 of the template datastore 148 are evaluated and grouped at 310. If multiple similar templates exist for the group at 320, the standard template is identified at 325. If multiple similar templates do not exist at 320, the method continues at 330.

The search user interface is generated based on the user interface data 188 at 330. User interactions with the search user interface are received as user input data 190 at 340. The user input data 190 is evaluated, and a search request is generated at 350. The metadata associated with the templates is evaluated based on the search request at 360. If no metadata matches the search request at 360, the method may end at 400.

If, however, metadata does match the search request at 360, the results 192 including one or more task templates 170 and/or project templates 172 are provided to the user at 370. If the results 192 indicate that a standard template exists, the task template 170 or project template 172 is identified as the standard at 380. One or more of the task templates and the project templates may then be selected and provided to create a new task or project in project management application at 390. Thereafter, the method may end at 400.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer implemented method executable by a multitenant server system to manage a project datastore of automatically-generated data templates each representing a project to be executed by a tenant of the multi-tenant server system, the method comprising:
receiving, at the multi-tenant server system, project data from the tenant of the multi-tenant server system, the project data tasks associated with the project;
automatically retrieving, by the multi-tenant server system, tenant-specific metadata and associating the tenant-specific metadata with the project data; the tenant specific metadata describing parameters of the project that are specific to the tenant of the multi-tenant server system;
analyzing, by the multi-tenant server system, the project data and the associated tenant-specific metadata to thereby automatically select a critical path and critical task data for the project, wherein the analyzing identifies the critical task of the project based on connecting activities in the project into a network plan and allowing users to identify tenant-specific activity durations and different dependency relationships between the activities and wherein the analyzing further evaluates relationships between the critical task data of the project to identify the critical path;

anonymizing at least some of the tenant-specific metadata in the project by the multi-tenant server system to thereby remove the parameters that are specific to the tenant;

automatically tagging the project by the multi-tenant server system according to a predetermined categorization scheme of projects in the project datastore, wherein the categorization scheme leverages inputs from task descriptions, key words and crowd-sourced data to group similar project data tasks together for the purpose of averaging the activity durations and comparing the dependency relationships;

storing, by the multi-tenant server system, the anonymized, tagged data from the project data and the associated tenant-specific metadata as a template in the project datastore; and publishing the template for use in a marketplace of the multi-tenant server system to thereby allow other tenants of the multi-tenant server system to retrieve the template from the project datastore and to re-use the critical path and critical task data of the project without sharing the parameters of the project that are specific to the tenant.

2. The computer-implemented method of claim 1 further comprising:

receiving user input data indicating a search request; and generating results including the template based on the search request.

3. The computer-implemented method of claim 2, wherein the receiving the user input data indicating the search request is via a marketplace user interface of the multi-tenant server system.

4. The computer-implemented method of claim 1, wherein the project data is received via a project management user interface of the multi-tenant server system.

5. A computer program product for managing a project in a multi-tenant server environment, comprising:

a non-transitory tangible storage medium readable by a processing circuit and storing instructions for execution by the processing circuit for performing a method comprising:

receiving user input data indicating project data that includes project information, task information, and details information, the details information describing features associated with the project;

automatically retrieving tenant-specific metadata and associating the tenant-specific metadata with the project data, the tenant specific metadata describing parameters of the project that are specific to a tenant of the multi-tenant server system;

analyzing the project data and the associated tenant-specific metadata to thereby automatically select a critical path and critical task data for the project, wherein the analyzing identifies the critical task of the project based on connecting activities in the project into a network plan and allowing users to identify tenant-specific activity durations and different dependency relationships between the activities and wherein the analyzing further evaluates relationships between the critical task data of the project to identify the critical path;

anonymizing at least some of the tenant-specific metadata in the critical path and critical task data by removing the parameters that are specific to the tenant;

automatically tagging the critical path and critical task data based on a categorization scheme, wherein the categorization scheme leverages inputs from task descriptions, key words and crowd-sourced data to group similar project data tasks together for the purpose of averaging the activity durations and comparing the dependency relationships;

storing the anonymized, tagged data from the project data and the associated tenant-specific metadata as at least one of a task template and a project template in a project datastore; and publishing the at least one of a task template and a project template for use in a marketplace of the multi-tenant server system to thereby allow other tenants of the multi-tenant server system to retrieve the at least one of a task template and a project template from the project datastore and to re-use the critical path and critical task data of the project without sharing the parameters of the project that are specific to the tenant.

6. The computer program product of claim 5, wherein the method further comprises identifying at least one of a standard task template and a standard project template based the grouping.

7. The computer program product of claim 5, wherein the receiving user input data indicating a search request is a via a marketplace user interface of the multi-tenant server system, and wherein the receiving the user input data indicating the project data is via a project management user interface of the multi-tenant server system.

8. A multi-tenant server system for managing a datastore of different projects, wherein each of the different projects is associated with one of a plurality of different tenants of the multitenant server system, the multi-tenant server system comprising:

a database that stores the datastore, wherein the datastore comprises data and metadata associated with each of the plurality of tenants; and a server system having a hardware processor that:

receives project data from a first tenant of the multi-tenant server system, the project data describing tasks associated with a first project to be performed by the first tenant;

automatically retrieves tenant-specific metadata associated with the first tenant from the database;

automatically associates the tenant-specific metadata with the project data, the tenant specific metadata describing parameters of the first project that are specific to the first tenant of the multi-tenant server system;

analyzing the project data and the associated tenant-specific metadata to thereby automatically select a critical path and critical task data for the first project, wherein the analyzing identifies the critical task of the project based on connecting activities in the project into a network plan and allowing users to identify tenant-specific activity durations and different dependency relationships between the activities and wherein the analyzing further evaluates relationships between the critical task data of the project to identify the critical path;

anonymizes at east some of the tenant-specific metadata from the first project to thereby remove the parameters that are specific to the first tenant;

automatically tags the first project by the multi-tenant server system according to a predetermined categorization scheme of projects in the project datastore, wherein the categorization scheme leverages inputs from task descriptions, key words and crowd-sourced data to group similar project data tasks together for the purpose of averaging the activity durations and comparing the dependency relationships:

stores the anonymized data as a template in the datastore;

publishes the template for use in a marketplace of the multi-tenant server system to retrieve the template from the project datastore in response to a subsequent request received from a second tenant that is different from the first tenant to thereby allow the second tenant to use the automatically-identified critical path and critical task data of the first project without sharing the parameters of the project that are specific to the first tenant of the multitenant server system.

* * * * *